United States Patent
Tanaka et al.

(10) Patent No.: US 6,580,244 B2
(45) Date of Patent: Jun. 17, 2003

(54) ACTIVE DAMPING AND BACKLASH CONTROL FOR SERVO SYSTEMS

(75) Inventors: Rick M Tanaka; Christopher M Lesniak; Richard Alan Kelley, all of Vancouver, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 39 days.

(21) Appl. No.: 09/769,861

(22) Filed: Jan. 24, 2001

(65) Prior Publication Data
US 2002/0097016 A1 Jul. 25, 2002

(51) Int. Cl.⁷ .............................. G05B 11/01
(52) U.S. Cl. .................. 318/560; 318/34; 318/48; 318/49; 318/63; 318/86; 318/90; 318/630; 318/625
(58) Field of Search ................. 318/34, 48, 49, 318/63, 86, 90, 630, 625, 560

(56) References Cited

U.S. PATENT DOCUMENTS

| | | | |
|---|---|---|---|
| 3,771,032 A | * 11/1973 | Hender | 318/45 |
| 4,015,799 A | 4/1977 | Koski et al. | |
| 4,126,818 A | * 11/1978 | Taylor | 318/46 |
| 4,360,354 A | 11/1982 | Bishop | |
| 4,540,920 A | 9/1985 | Cutler et al. | |
| 4,709,630 A | 12/1987 | Wilkins et al. | 101/93.22 |
| 5,456,543 A | 10/1995 | Witte et al. | 400/577 |
| 5,704,250 A | * 1/1998 | Black | 318/48 |
| 5,788,384 A | 8/1998 | Goodwin et al. | 400/208 |
| 5,820,280 A | 10/1998 | Fox | 400/611 |
| 6,002,468 A | 12/1999 | Hicks | 355/71 |
| 6,054,835 A | 4/2000 | Thiemann et al. | 318/685 |
| 6,081,089 A | 6/2000 | Godon et al. | 318/560 |

FOREIGN PATENT DOCUMENTS

| | | |
|---|---|---|
| EP | 0476939 | 3/1992 |
| JP | 2000-141857 | 5/2000 |

* cited by examiner

Primary Examiner—Karen Masih

(57) ABSTRACT

Two motors are used to provide motion control in a transport drive system. A primary motor, or a primary and secondary motor, provides primary power for accelerated motion. PWM signals are used to drive the motors according to predetermined fixed functions related to acceleration, deceleration and hold of a load. Alternatively, during onset of large or high speed moves, the primary and secondary motors are on in tandem. During deceleration of a move, the torque provided by the secondary motor is reversed, providing active braking and ensuring the drive train remains loaded wherein backlash is eliminated. During a driver hold phase, the primary and secondary motor push against each other to actively control positioning.

7 Claims, 4 Drawing Sheets

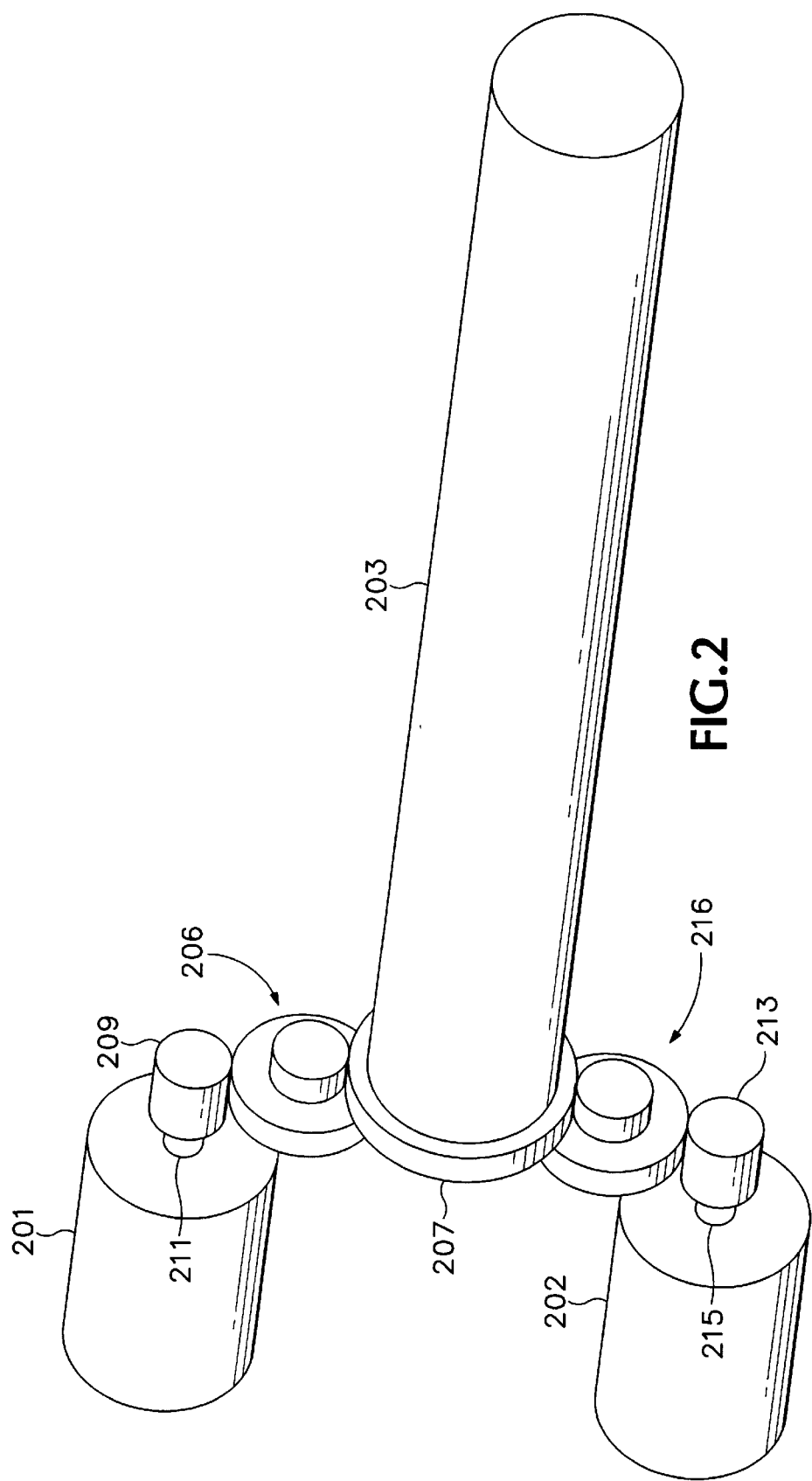

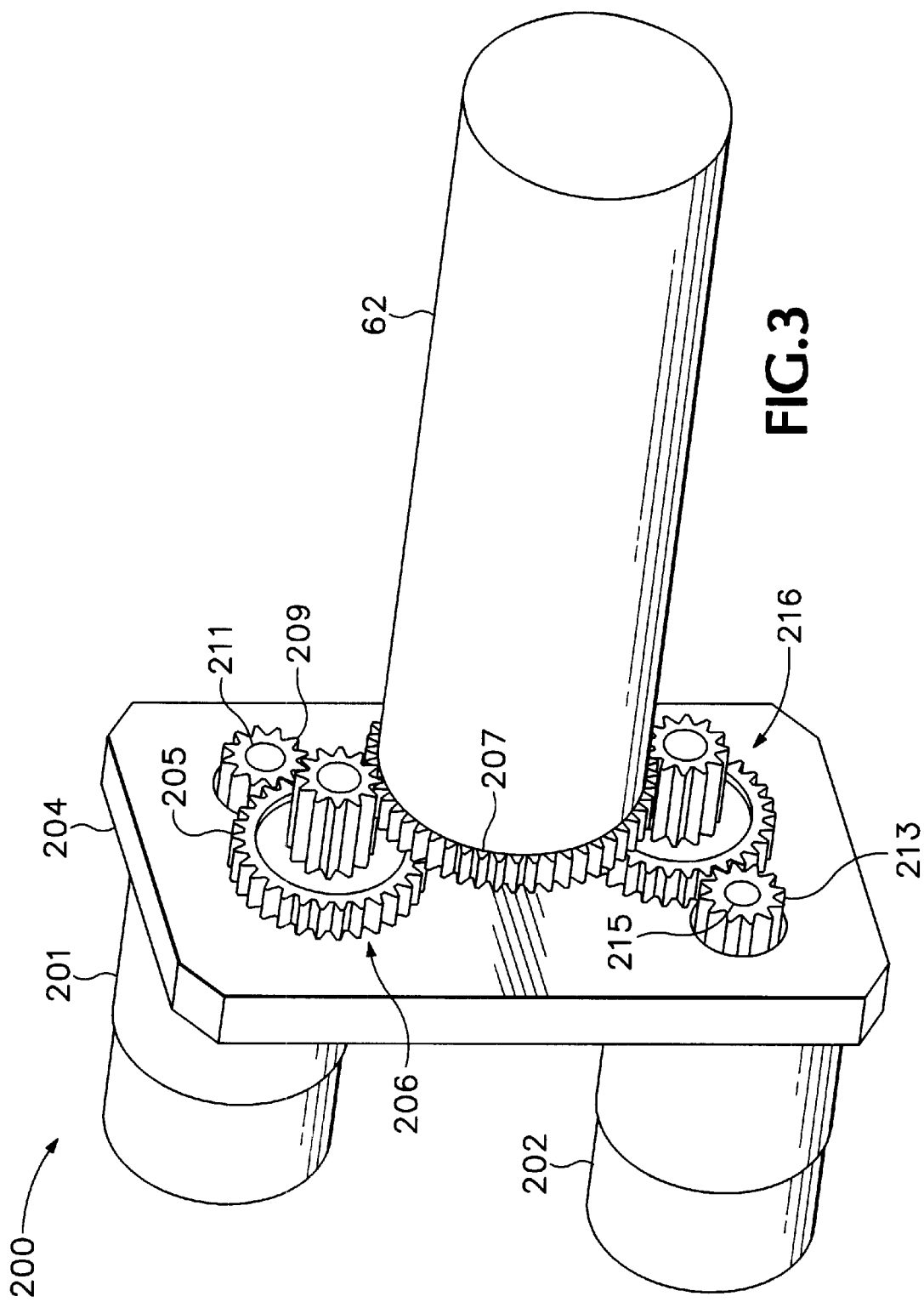

ACTIVE DAMPING AND BACKLASH CONTROL FOR SERVO SYSTEMS

CROSS-REFERENCE TO RELATED APPLICATIONS

None.

STATEMENT REGARDING FEDERALLY SPONSORED RESEARCH OR DEVELOPMENT

None.

REFERENCE TO AN APPENDIX

None.

BACKGROUND OF THE INVENTION

1. Field of the Invention

The present invention relates generally to servo systems, and more particularly to servo systems actuated by a DC or stepper motor where high speed and highly accurate motion control is required.

2. Description of the Related Art

There are many systems where the physical transport of material requires both a relatively high speed and highly accurate motion control. A specific example used herein to describe the present invention is a servo system such as found in a hard copy apparatus ("printer" hereinafter) print media path (also referred to more simply as a "paper path") where translation of a sheet of print medium ("paper" hereinafter) relative to one or more writing instruments ("pen(s)" hereinafter) is critical to print quality. The present invention will be described in an exemplary embodiment for an inkjet printer; no limitation on the scope of the invention is intended by the inventors through the use of this exemplary embodiment nor should any be implied therefrom. The art of ink-jet technology is relatively well developed. Commercial products such as computer printers, graphics plotters, copiers, and facsimile machines employ ink-jet technology for producing hard copy. The basics of this technology are disclosed, for example, in various articles in the *Hewlett-Packard Journal*, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994) editions. Ink-jet devices are also described by W. J. Lloyd and H. T. Taub in *Output Hardcopy [sic] Devices*, chapter 13 (Ed. R. C. Durbeckand S. Sherr, Academic Press, San Diego, 1988).

FIGS. 1A and 1B are schematic depictions of an ink-jet hard copy apparatus 101 in accordance with the present invention. A writing instrument 20 is provided with a printhead 14 having drop generators including nozzles for ejecting ink droplets onto an adjacently positioned print medium, e.g., a sheet of paper 22, transported through the apparatus' printing zone 28. [The word "paper is used hereinafter for convenience as a generic term for all print media; the implementation shown is for convenience in explaining the present invention and no limitation on the scope of the invention is intended by the inventors nor should any be implied.] An endless-loop belt 26 is one type of known manner paper transport. A motor (not shown) is used to drive a belt pulley 62. A biased idler 64 provides appropriate tensioning of the belt 26. The belt 26 rides over a platen 42 surface of a vacuum box 40 in the print zone 28. The platen 42, having vacuum ports 44, is associated with a vacuum induction system 48, 50. The paper sheet 22 is picked from an input supply (not shown) and its leading edge is delivered to the vacuum belt 26 (the paper path is represented by arrow "Y").

In general, paper motion is usually actuated by a DC-motor or stepper motor coupled to the belt pulley 62. Other paper transport devices such as pinch-drive roller combinations engaging one or more surfaces of the sheet of paper are also known in the art and the present invention can be adapted for use therewith. Note also that while in the state of the art ink-jet printing, where swaths of print are usually scanned sequentially in the x-axis, motion in the y-axis is generally unidirectional. However, it is also known to have bidirectional paper motion in contact pen plotters. It will be recognized by those skilled in the art that he present invention is applicable to both types of technology.

The problem is in producing a relatively rapid motion of the paper in the y-axis in combination with accurate positioning relative to the pens. Design engineers must deal with the various subsystems of the media drive system, namely, gear train (also referred to hereinafter as "transmission") wind up, backlash, and lack of viscous damping. Both transmission wind up and backlash will generally result in poor line feed accuracy, contributing to poor image quality. A variety of individual or combinable solutions have been employed in the art.

One prior solution is to provide a direct drive, i.e., a direct coupling between the motor and media. Driving a mechanical system without gear reduction or transmission results in systems that are not optimized. Alternatively, a larger motor must be employed to accomplish what a smaller motor with gear reduction can achieve.

Another solution is to provide mechanisms for inducing friction. Friction intentionally added to a system will inevitably detract from performance because of lack of power, loss of efficiency, and the added expense of a viscous dashpot. Moreover, friction components are difficult to duplicate accurately for mass produced products.

Another solution is to add separate braking mechanisms. Brakes can be actuated only as needed, but require potentially expensive actuators (such as solenoid mechanisms).

Yet another solution is to tune a servo system for overdamped behavior. This is a typical practice in achieving a stable stopping point while avoiding backlash. However, over-damped systems are always suboptimal in speed performance. The load approaches its target position monotonically. This is logical as the load is effectively controlled in one direction; if the load overshoots the target position, the backlash in the gear train will result in over compensation in the opposite direction. This solution does not account for relaxation of transmission wind up.

Still another solution is to use creep motion. Creep moves are specially designed servo motions that are optimized for low speeds. Large portions of servo moves are done under high speed, lightly damped, conditions. As the commanded position is nearing, the servo system enters a creep move behavior in which the system slows to a minimum speed need for a smooth motion (viz, no stick-slip behavior) to the final target position. The slow speed is used to minimize wind-up and distance traveled after the actuation force is moved. This method can be exceptionally slow if the system characteristics (friction, inertia) do not fall within a small tolerance window. Neither does this solution account for relaxation of transmission wind up.

A further solution is the use of anti-backlash gear trains. Anti-backlash gears can eliminate most of the problems produced by the backlash in a gear train, but it does not address the lower proportion of viscous friction with respect to dry friction in many systems. Servos for holding position are not symmetrical since one direction will have a distinctly different compliance. This solution does not address the issue of transmission wind up.

Therefore, there is a need for an active damping and backlash control system for high speed transport systems requiring highly accurate motion control.

SUMMARY OF THE INVENTION

In its basic aspects, the present invention provides a servo control system including: a directional load; a primary motor coupled to the load; a secondary motor coupled to the load, wherein during acceleration operation of the load the primary motor and secondary motor drive in tandem, and during deceleration and hold position operations of the load the primary motor and secondary motor drive the load with opposing but not necessarily equal torque.

In another basic aspect, the present invention provides a method for actively damping and substantially eliminating backlash in a servo motion control system, the method including: during acceleration and constant velocity operation on a load, a primary motor and secondary motor drive in tandem, and during deceleration and hold position operations on the load, the primary motor and secondary motor drive the driver with opposing torque.

In another aspect, the present invention provides a hard copy apparatus, having a servo paper transport system, including: at least one printing device; a belt for transporting paper to a position adjacent said printing device; a driver for moving said belt; and a servo system for controlling motion of the driver, the servo system having a primary motor coupled to the driver, and a secondary motor coupled to the driver, wherein during acceleration operations of the driver the primary motor and secondary motor drive in tandem, and during deceleration and hold position operations of the driver the primary motor and secondary motor drive the driver with opposing and not necessarily equal torque.

Another aspect of the present invention is a servo control system including: two motors a primary motor and a secondary motor coupled to a load as a tandem pair, said motors each receiving a different PWM control signal wherein the PWM for the primary motor is equal to the PWM generated by a control fixed-functions plus a predetermined offset and the PWM for the secondary motor is equal to the PWM generated by the control fixed-functions minus the predetermined offset.

Another aspect of the invention is a method for actively damping and substantially eliminating backlash in a servo motion control system, the method including: a primary motor coupled to a load is provided with power that is more than a prescribed control fixed-function, a secondary motor coupled to the load is provided with power that is less than the prescribed control fixed-function wherein the secondary motor is still contributing positively to the acceleration of the load such that during an acceleration portion of a move, desired velocity is greater than the actual velocity of the system via providing a large positive PWM to create desired acceleration to overcome inertia and friction.

Another aspect of the present invention provides a hard copy apparatus, having a servo paper transport system, including: at least one printing device; a belt for transporting paper to a position adjacent said printing device; a driver for moving said belt; and a servo system for controlling motion of the driver, the servo system having a primary motor coupled to the driver, and a secondary motor coupled to the driver, wherein said two motors are coupled to the driver as a tandem pair, said motors each receiving a different PWM control signal wherein the PWM for the primary motor is equal to the PWM generated by a control fixed-functions plus a predetermined offset and the PWM for the secondary motor is equal to the PWM generated by the control fixed-functions minus the predetermined offset.

Some of the advantages of the present invention are:

servo control systems in accordance with the invention can be driven at higher speeds than prior art without sacrificing stopping and holding accuracy;

higher accelerations are achieved by combining the power of two motors;

the rate of deceleration is increased by using a secondary motor as an active brake;

decelerations are no longer dependent on system friction which can vary from unit to unit and over time and operating conditions;

servo designs in accordance with the present invention substantially eliminate the need to reduce performance of a product to meet design margins, eliminating the worst case scenario design methodology;

stopping accuracy is improved because of the ability to influence the load in two directions equally during deceleration and hold functions;

holding accuracy is improved as disturbances, such as vibrations, will not cause the gear train to unload with resultant load creep, i.e., the load is held actively in place with no chance of unloading the gear train;

continuous drive loading substantially eliminates backlash, overshoot, and ringing all of which result in poor stopping accuracy;

The foregoing summary and list of advantages is not intended by the inventors to be an inclusive list of all the aspects, objects, advantages, or features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the basic nature of the invention in order to be of assistance in aiding ready understanding of the patent in future searches. Other aspects, objects, advantages, and features of the present invention will become apparent upon consideration of the following explanation and the accompanying drawings, in which like reference designations represent like features throughout the drawings.

BRIEF DESCRIPTION OF THE DRAWINGS

FIG. 2 is a schematic illustration of the fundamental motor and transmission construct in accordance with the present invention.

FIG. 3 is a schematic perspective view of the present invention as shown in FIG. 2.

DESCRIPTION OF THE PRESENT INVENTION

Reference is made now in detail to a specific embodiment of the present invention, which illustrates the best mode presently contemplated by the inventors for practicing the invention. Alternative embodiments are also briefly described as applicable.

Figure 1A:
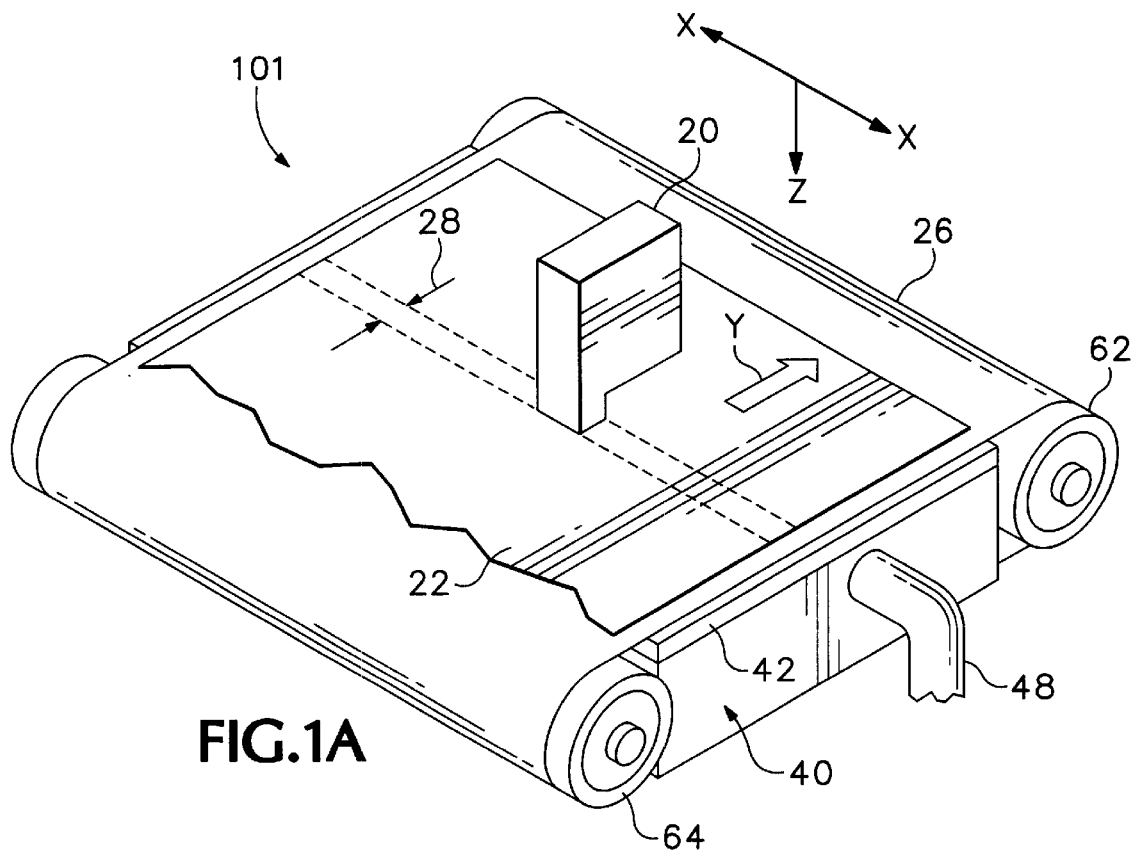
FIGS. 1A and 1B depict an exemplary ink-jet printer in accordance with the present invention.
Figure 1B:
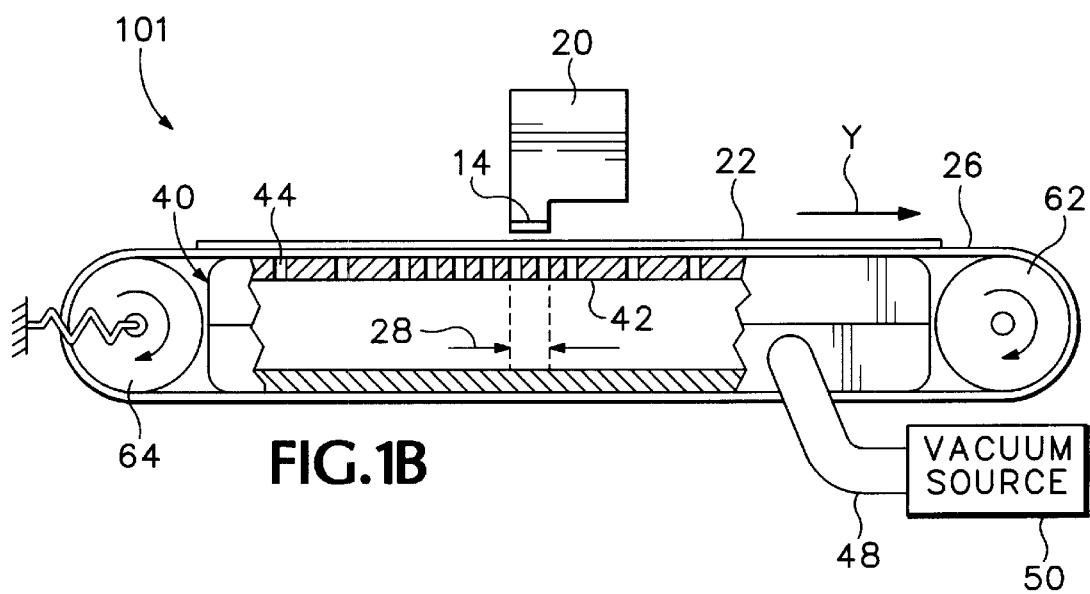

Turning to FIGS. 2 and 3, active damping and backlash control system 200 two motors 201, 202 are used to provide motion control to a large inertial load 203, in the embodiment as shown in FIG. 2, the load 203 is a vacuum belt drive roller 62 as in FIGS. 1A and 1 B and so labeled in FIG. 3. An appropriate housing mount 204 is provided as needed for any specific implementation.

A primary motor 201 is used as the main power delivery mechanism to provide paper motion. Direct drive of the load 203 can be employed. However, to optimize performance, the primary motor 201 is linked to the load 203/drive roller 62 via a mechanical reduction. In this embodiment, a motor pinion 209 on the primary motor 201 drive shaft 211 is intermeshed with a primary gear 205 of a primary transmission cluster 206. The primary transmission cluster 206 is coupled to a drive gear 207 directly coupled to the load 203/drive roller 62.

The secondary motor 202 has a pinion 213 directly coupled the secondary motor shaft 215. The secondary motor 202 can power the load 203/drive roller 62 directly or again with gear reduction optimization, using a transmission cluster 216.

Figure 5:
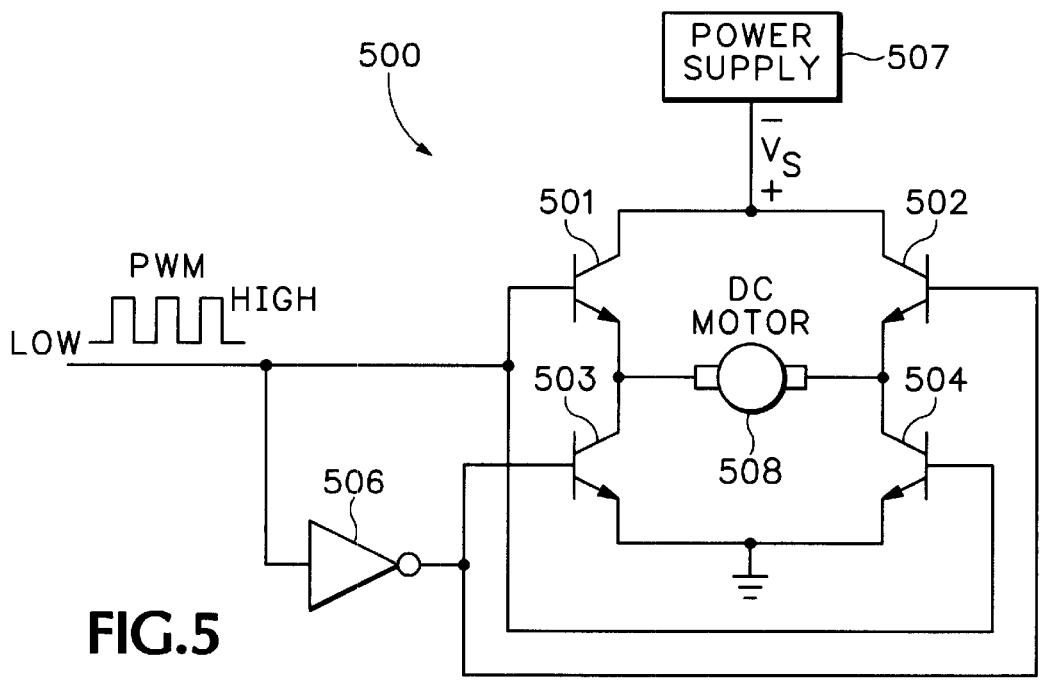
FIG. 5 is a electrical schematic of a controller construct in accordance with the present invention as shown in FIGS. 2–4.

FIG. 5 illustrates a primary motor 201 controller 500. When the signal PWM level is HIGH, transistor 501 and transistor 504 are switched ON (closed) and transistor 502 and transistor 503 are OFF (open). Current will flow through the DC Motor 508 from the Power Supply 507 via transistor 501 and through transistor 504 (grounded drain electrode). When the signal PWM level is LOW, via the inverter 506, transistor 503 and 502 are switched ON (closed) and transistor 501 and transistor 504 are switched OFF (open). Current will flow through the DC Motor 508 from the Power Supply 507 via transistor 502 and through transistor 503 (grounded drain electrode). That is, the polarity across the DC Motor 508 is reversed by signal PWM. PWM is driven at a frequency that is much greater than the natural frequencies in the system. The duty cycle of PWM determines the direction and timing of the applied voltage to DC Motor 508. A one-hundred percent (100%) duty cycle will apply the full power supply voltage to the DC Motor 508. A zero percent (0%) duty cycle will apply the full negative power supply voltage to the DC Motor 508. A fifty percent (50%) duty cycle applies a net zero voltage to the DC Motor. A full bridge driver motor control is available commercially from SGS-THOMSON Microelectronics, model no. L6201, L6202–L6203.

Alternatively, the motor drive can be achieve by pulse width modulation of a bipolar power supply, or other equivalent function devices as may be known in the art.

In operation, the system uses two DC motors to control a large inertial load that sometimes requires that one motor act as a brake while the other motor is continuing to act positively (in the direction of motion) on the load. The motor which is acting as a brake is trying to move the load to a position behind its present position which the positive action motor is trying to move the load to a position which is ahead of its present position. The braking motor is sourcing energy back into the power supply through the controller while the positive action motor is actively pushing on the load and is sinking energy from the power supply.

Figure 4:
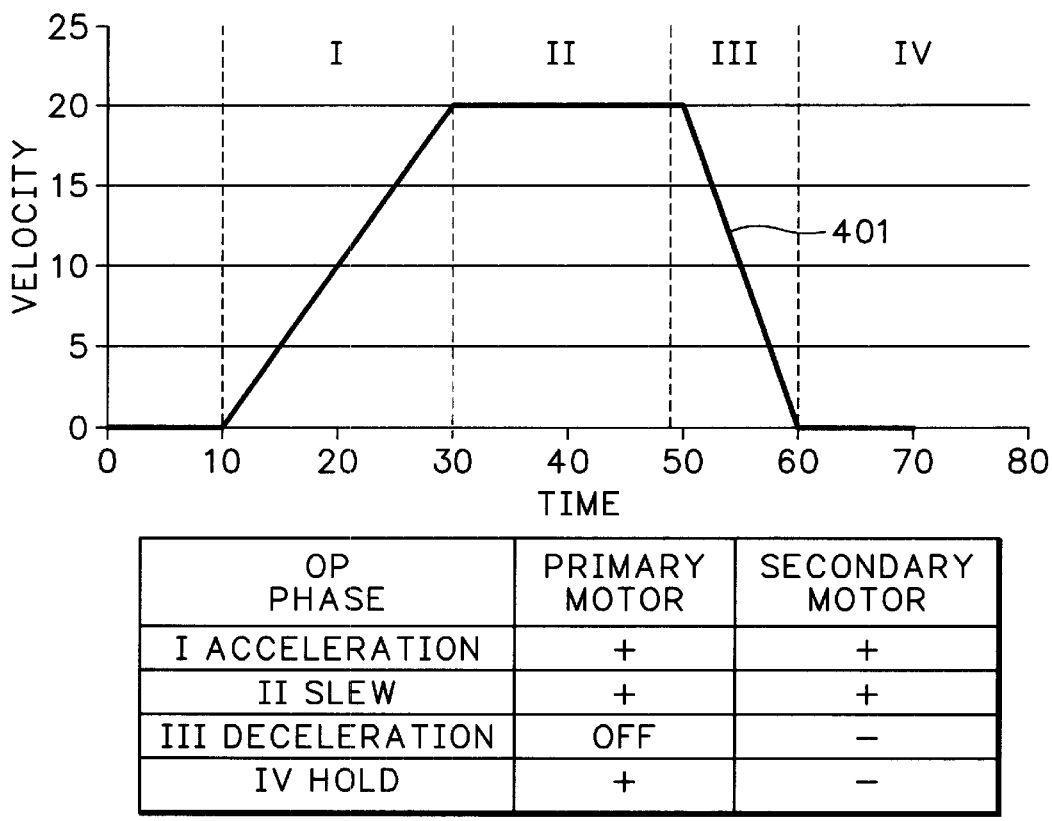
FIG. 4, including legend, relates transport phase to motor control for the present invention as shown in FIGS. 2 and 3.

FIG. 4 is an exemplary plot of velocity versus time, useful in understanding operation of the present invention (not necessarily a best case). During the onset of large or high speed moves, such as transporting a leading edge of a sheet of paper 22 from an input to the edge of the print zone 28, both the primary and secondary motors 201, 202 are energized in tandem (represented in the legend by the "+" symbol), providing rapid acceleration. This is represented in FIG. 4 by the curve 401 region "I Acceleration." Next there is a constant velocity phase of operation, curve 401, region "II Slew." Then, during a deceleration phase of operation, curve 401, region "III Deceleration," the primary motor 201 is OFF and torque provided by the secondary motor 202 is reversed (represented in the legend by the "−" symbol), providing active braking and ensuring that the gear train remains loaded, eliminating backlash. When the drive roller 62 is at rest, namely the target position has been achieved as represented in curve 401 by the region labeled "IV Hold," the secondary motor 202 and the primary motor 201 are pushing against each other, actively controlling the drive roller position. This continuous loading of the gear train 209, 205, 207 eliminates backlash, overshoot and ringing. In summary, Two motors 201, 202 are used to provide motion control in a transport drive system 200. A primary motor 201 provides primary power for accelerated motion. During onset of large or high speed moves, the primary and secondary motors are on in tandem. During deceleration of a move, the torque provided by the secondary motor 202 is reversed, providing active braking and ensuring the drive train (209, 205, 207) remains loaded wherein backlash is eliminated. During a driver 62 hold phase (IV), the primary and secondary motor push against each other to actively control positioning.

During the onset of large or high speed moves (graph and table region I), such as transporting a leading edge of a sheet of paper 22 from an input to the edge of the print zone 28, both the primary and secondary motors are energized in tandem according to a servo control fixed-functions and a desired velocity or position profile. As an example, this may be a Proportional Integral Derivative ("PID") controller (a PID control fixed-functions which bases the motor drive on the differences in the desired control quantity, the derivative of error, and the integral of that error). The resulting output of the PID controller could be a voltage or a PWM in the case of many motor control applications.

If two motors 201, 202 are used simply as a tandem pair, they would both receive the same input voltage, current, or PWM. In the case of this active damping method, the servo control fixed-functions operates as before but each of the motors receives a different PWM. The PWM that is meant for the primary motor is equal to the PWM generated by the control fixed-functions plus some offset or "delta PWM". The PWM for the secondary motor is equal to the PWM generated by the control fixed-functions minus the same offset or "delta PWM". The value of this quantity (delta PWM) is based on the desired amount of opposition between the two motors.

Given this modification to a control system with two motors, the following behavior results during a typical move to position command in which there is an acceleration region (FIG. 4, "I"), a constant velocity region ("II"), a deceleration region ("III"), and a hold region ("IV").

More specifically, during the acceleration portion of a move, I, the desired velocity is greater than the actual velocity of the system, and the control fixed-functions will prescribe a large positive PWM to create the desired acceleration to overcome inertia and friction. The primary motor will receive power that is more than the control fixed-functions prescribes, and the secondary motor will receive power that is less than what is prescribed, but that is still contributing positively to the acceleration of the load.

During the constant velocity portion of the move, II, control fixed-functions will prescribe a PWM that is required to overcome the friction in the system. The desired position is greater than the actual position so the control fixed-functions will prescribe a positive PWM to the motors. Again, the primary motor will receive more power and the secondary motor will receive less power, but both contribute to maintaining velocity. However, if the PWM required to maintain velocity is low enough, it may be possible that the secondary motor is negatively biased.

During the deceleration portion of the move, III, the load should decelerate because of the system friction, and the control fixed-functions and motors will behave according to the desired rate of deceleration. In the case of a violent deceleration profile, it is possible for the control fixed-functions to prescribe a large negative PWM (negative PWM implies a PWM requiring a negatively biased application of power to the motor). Both motors are negatively biased, but the transmission remains loaded as before. In the case of a very moderate deceleration profile, both motors may be positively biased similar to the case of a constant velocity region.

As the load decelerates and reaches zero velocity at the desired position, IV, the output of the control fixed-functions should nominally be zero unless there are residual forces, such as "stiction" (friction that tends to prevent relative motion between two movable parts at their null position). In this case, the primary motor is applying torque in a positive direction ("+"), and the secondary motor is applying torque in the opposite direction ("−"). This maintains the loading on the transmission and maintains the position of the load. Any disturbances will result in action by the control fixed-functions to force the load back to the desired position without unloading the transmission.

Note that throughout each of the regions, there is a difference in torque that is output by the two motors because of the offset in their PWM. This handling of the control results in a smooth and continuous operation between each of the regions of operation.

There is an alternative embodiment of the active damping and backlash control algorithm that can be used with a novel high speed/high accuracy servo move. This is a specialized motion algorithm used to generate high speed and very accurate moves over short distances such as those used in ink-jet printers. This algorithm is described in detail in U.S. Ser. No. 09/502427, filed Feb. 11, 2000, by C. M. Lesniak for a MEDIA ADVANCE SYSTEM FOR A PRINTER, incorporated herein by reference. In the main part, this alternative media advance system operates open loop for the acceleration and during deceleration, the system follows a predetermined estimate of a natural trajectory to zero velocity. This results in a minimum of control effort required to bring the media to an accurate stop. During the acceleration, both motors are controlled open loop, that is, a constant PWM is applied to both motors. During the acceleration, the location of the media is tracked until it reaches an intersection with a predetermined trajectory that is completed at the desired end point. When the system has reached this point, the control fixed-functions will follow the predetermined trajectory using the active damping algorithm and continue during the hold phase.

The foregoing description of the preferred embodiment of the present invention has been presented for purposes of illustration and description. It is not intended to be exhaustive or to limit the invention to the precise form or to exemplary embodiments disclosed. Many modifications and variations will be apparent to practitioners skilled in this art. Similarly, any process steps described might be interchangeable with other steps in order to achieve the same result. The disclosed embodiment was chosen and described in order to best explain the principles of the invention and its best mode practical or preferred application, thereby to enable others skilled in the art to understand the invention for various embodiments and with various modifications as are suited to the particular use or implementation contemplated. It is intended that the scope of the invention be defined by the following claims and there equivalents. Reference to an element in the singular is not intended to mean "one and only one" unless explicitly so stated, but can mean "one or more." Moreover, no element, component, nor method step in the present disclosure is intended to be dedicated to the public regardless of whether the element, component, or method step is explicitly recited in the claims. No claim element herein is to be construed under the provisions of 35 U.S.C. Sec. 112, sixth paragraph, unless the element is expressly recited using the phrase "means for . . . "

What is claimed is:

1. A servo control system of an ink-jet hard copy apparatus, the servo control system comprising:
   a primary motor and a secondary motor coupled to a load as a tandem pair, said motors each receiving a different PWM control signal from the apparatus, wherein the PWM for the primary motor is equal to the PWM generated by a control fixed-functions plus a predetermined offset and the PWM for the secondary motor is equal to the PWM generated by the control fixed-functions minus the predetermined offset.

2. The system as set forth in claim 1, wherein the value of the offset is quantity is based on a desired amount of opposition between the two motors.

3. A method for actively damping and substantially eliminating backlash in a servo motion control system, the method comprising:
   coupling a primary driving motor [coupled] to a load with power that is more than a prescribed control fixed-function,
   coupling a secondary motor to the load with power that is less than the prescribed control fixed-function, and
   using a relatively large positive PWM for creating desired acceleration for overcoming inertia and friction such that the secondary motor is still contributing positively to the acceleration of the load such that, during an acceleration portion of a move, desired velocity is greater than the actual velocity of the system.

4. The method as set forth in claim 3 wherein during a constant velocity portion of the move, control fixed-functions prescribe a PWM that is required to overcome the friction in the system.

5. The method as set forth in claim 4 wherein during the constant velocity portion of the move, the primary motor receives more power and the secondary motor will receive less power than the fixed function wherein both contribute to maintaining velocity.

6. The method as set forth in claim 3 wherein during a deceleration portion of the move, the control fixed-function PWM and offsets are prescribed according to a desired rate of deceleration.

7. A hard copy apparatus, having a servo paper transport system, comprising:
   at least one printing device;
   a belt for transporting paper to a position adjacent said printing device;

a driver for moving said belt; and a servo system for controlling motion of the driver, the servo system having a primary motor coupled to the driver, and a secondary motor coupled to the driver, wherein said two motors are coupled to the driver as a tandem pair, said motors each receiving a different PWM control signal from the apparatus, wherein the PWM for the primary motor is equal to the PWM generated by control fixed-functions plus a predetermined offset and the PWM for the secondary motor is equal to the PWM generated by the control fixed-unctions minus the predetermined offset.

* * * * *

UNITED STATES PATENT AND TRADEMARK OFFICE
CERTIFICATE OF CORRECTION

PATENT NO. : 6,580,244 B2
DATED : June 17, 2003
INVENTOR(S) : Tanaka et al.

It is certified that error appears in the above-identified patent and that said Letters Patent is hereby corrected as shown below:

Column 8,
Line 39, delete "[coupled]".

Column 10,
Line 4, delete "fixed-unctions" and insert therefor -- fixed-functions --.

Signed and Sealed this

Eighteenth Day of May, 2004

JON W. DUDAS
*Acting Director of the United States Patent and Trademark Office*